(12) United States Patent
Wu et al.

(10) Patent No.: US 11,741,722 B2
(45) Date of Patent: Aug. 29, 2023

(54) COARSE-TO-FINE ATTENTION NETWORKS FOR LIGHT SIGNAL DETECTION AND RECOGNITION

(71) Applicant: International Business Machines Corporation, Armonk, NY (US)

(72) Inventors: Bo Wu, Cambridge, MA (US); Chuang Gan, Cambridge, MA (US); Yang Zhang, Cambridge, MA (US); Dakuo Wang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 17/012,463

(22) Filed: Sep. 4, 2020

(65) Prior Publication Data
US 2022/0076035 A1 Mar. 10, 2022

(51) Int. Cl.
*G06V 20/58* (2022.01)
*G06V 30/194* (2022.01)

(52) U.S. Cl.
CPC .......... *G06V 20/584* (2022.01); *G06V 30/194* (2022.01)

(58) Field of Classification Search
CPC ...... G06V 10/40; G06V 10/82; G06V 10/945; G06V 10/955; G06V 20/10; G06K 9/6256; G06N 3/08
See application file for complete search history.

(56) References Cited

U.S. PATENT DOCUMENTS

| | | | | |
|---|---|---|---|---|
| 7,689,033 | B2 * | 3/2010 | Xiao | G06V 10/446 382/118 |
| 9,456,776 | B2 | 10/2016 | Ando | |
| 10,251,245 | B2 | 4/2019 | Roberts et al. | |
| 11,350,840 | B2 * | 6/2022 | Iwasaki | G01N 33/4833 |
| 2020/0026936 | A1 * | 1/2020 | Liu | G06V 10/764 |

(Continued)

FOREIGN PATENT DOCUMENTS

| | | |
|---|---|---|
| CN | 102567965 A | 7/2012 |
| CN | 106845453 A | 6/2017 |

(Continued)

OTHER PUBLICATIONS

Shenao Zhang, Bo Wu, Xin He, Lei Kuang, and Delu Zeng; "Coarse-to-Fine Attention: Self-Luminous Object Detection for Autonomous Driving"; Journal of Latex Class Files, vol. 14, No. 8, Aug. 2015.*

(Continued)

*Primary Examiner* — Shaghayegh Azima
(74) *Attorney, Agent, or Firm* — Peter Edwards; McGinn IP Law Group, PLLC

(57) ABSTRACT

A vehicle light signal detection and recognition method, system, and computer program product include bounding, using a coarse attention module, one or more regions of an image of an automobile including at least one of a brake light and a signal light generated by automobile signals which include illuminated sections to generate one or more bounded region, removing, using a fine attention module, noise from the one or more bounded regions to generate one or more noise-free bounded regions, and identifying the at least one of the brake light and the signal light from the one or more noise-free bounded regions.

14 Claims, 12 Drawing Sheets

(56) References Cited

U.S. PATENT DOCUMENTS

| | | | |
|---|---|---|---|
| 2020/0125095 | A1 | 4/2020 | Lengsfeld et al. |
| 2020/0143203 | A1* | 5/2020 | Liang ..................... G06N 3/044 |
| 2021/0019893 | A1* | 1/2021 | Ananthanarayanan ...................... G06F 21/75 |
| 2021/0177522 | A1* | 6/2021 | Boddington ........... G16H 30/40 |
| 2022/0067278 | A1* | 3/2022 | Huang ................. G06F 40/258 |

FOREIGN PATENT DOCUMENTS

| | | | |
|---|---|---|---|
| CN | 108509907 | A | 9/2018 |
| CN | 109934221 | A | 6/2019 |
| CN | 110458233 | A * | 11/2019 |
| CN | 110458233 | A * | 11/2019 |

OTHER PUBLICATIONS

Zhang, S., Wu, B., He, X., Kuang, L., & Zeng, D. "Coarse-to-Fine Attention: Self-Luminous Object Detection for Autonomous Driving "; 2015.*

Z. Cui, S. -W. Yang and H. -M. Tsai, "A Vision-Based Hierarchical Framework for Autonomous Front-Vehicle Taillights Detection and Signal Recognition," 2015 IEEE 18th International Conference on Intelligent Transportation Systems, 2015.*

Zhang et al. "Coarse-to-Fine Attention: Self-Luminous Object Detection for Autonomous Driving"; 2015.*

Cui et al., "A Vision-Based Hierarchical Framework for Autonomous Front-Vehicle Taillights Detection and Signal Recognition," IEEE, 2015.*

Hoanh Nguyen; "Improving Faster R-CNN Framework for Fast Vehicle Detection"; Hindawi Mathematical Problems in Engineering vol. 2019 (Year: 2019).*

Hua-Tsung Chen et al;"Daytime Preceding Vehicle Brake Light Detection Using Monocular Vision"; IEEE (Year: 2016).*

Zhang et al. "coarse -to-fine attention: self-luminance object detection for autonomous driving"; Journal of late class files. (Year: 2015).*

Mel, et al. "The NIST Definition of Cloud Computing". Recommendations of the National Institute of Standards and Technology. Nov. 16, 2015.

Frossard, D. et al.; "Deepsignals: Predicting Intent of Drivers Through Visual Signals", arXiv:1905.0133v1 [cs.CV] May 3, 2019.

Huang, Y. et al.; "Autonomous Driving with Deep Learning: A Survey of State-Of-Art Technologies", Autonomous Driving Research, Black Sesame Technology Inc. Santa Clara, USA and Corporate Technology Strategy, Futurewei Technology Inc., Santa Clara, USA.

Authors, et al., Disclosed Anonymously: "Method and System for External Validation of Automobile Issues Using IoT Data". An IP.com Prior Art Database Technical Disclosure, IP.com No. IPCOM000257549D, IP.com Electronic Publication Date: Feb. 18, 2019.

Authors, et al., Disclosed Anonymously; "Task-Specific Color Spaces and Compression for Machine-Based Object Recognition", An IP.com Prior Art Database Technical Disclosure, IP.com No. IPCOM000258051D, IP.com Electronic Publication Date: Apr. 3, 2019.

Authors, et al., Disclosed Anonymously; "Optical Spectrum Analyzer Signal Types Classification and Channel Identification", An IP.com Prior Art Database Technical Disclosure, IP.com No. IPCOM000262559D, IP.com Electronic Publication Date: Jun. 11, 2020.

Lopez, Pr.; "Towards Robust Neural Models for Fine-Grained Image Recognition", Universität Autonoma de Barcelona, Jan. 17, 2019.

Wang, W. et al.; "Deep Visual Attention Prediction", IEE Transactions on image processing, arXic:1705.02544v3 [cs.CV] Mar. 22, 2018.

Ross Girshick. 2015. "Fast R-CNN", The IEEE International Conference on Computer Vision (ICCV).

Ross Girshick, et al, 2014. "Rich Feature Hierarchies for Accurate Object Detection and Semantic Segmentation". In Proceedings of the IEEE conference on computer vision and pattern recognition. 580-587.

Shaoqing Ren, et al. 2015. Faster R-CNN: "Towards real-time object detection with region proposal networks". In Advances 1000 in neural information processing systems. 91-99.

International Search Report (ISR) (PCT Form PCT/ISA/220), PCT/CN2021/107717, dated Oct. 19, 2021.

International Search Opinion (PCT/ISA/237) dated Oct. 19, 2021.

* cited by examiner

| Methods | backbone | C-A | F-A | Day | | | | Night | | | | mAP |
|---|---|---|---|---|---|---|---|---|---|---|---|---|
| | | | | forward | brake | left | right | forward | brake | left | right | |
| Faster RCNN | VGG16 | | | 67.17 | 84.31 | 39.65 | 53.46 | 84.33 | 80.79 | 39.53 | 39.16 | 61.05 |
| Invention | VGG16 | √ | | 78.42 | 86.32 | 42.02 | 45.75 | 85.97 | 81.91 | 43.16 | 47.22 | 63.85 |
| | VGG16 | √ | √ | 79.88 | 86.51 | 45.69 | 55.21 | 86.14 | 83.50 | 49.28 | 51.67 | 67.24 |
| Faster RCNN | Resnet50 | | | 74.35 | 85.59 | 41.15 | 49.46 | 83.72 | 80.85 | 47.69 | 48.00 | 63.85 |
| Invention | Resnet50 | √ | | 77.08 | 85.18 | 44.75 | 56.56 | 82.59 | 81.63 | 46.44 | 52.67 | 65.86 |
| Invention | Resnet50 | √ | √ | 70.14 | 84.96 | 46.25 | 48.97 | 83.75 | 83.49 | 58.67 | 58.15 | 66.80 |
| RFnet [42] | | | | 69.44 | 83.20 | 35.67 | 39.71 | 72.23 | 74.91 | 27.67 | 29.86 | 54.09 |

COARSE-TO-FINE ATTENTION NETWORKS FOR LIGHT SIGNAL DETECTION AND RECOGNITION

BACKGROUND

The present invention relates generally to a vehicle light signal detection and recognition method, and more particularly, but not by way of limitation, to a system, method, and computer program product for detecting and recognizing the semantics of vehicle taillight signals for autonomous driving.

A problem of vehicle taillight detection for autonomous driving has attracted increasing attention since it is vital for assisting automobiles in accurately identifying the driving intension of other vehicles and quickly making driving decisions based on the detection outputs. An "attention mechanism" has proven useful to boost the discriminative power to obtain expressive models. Self-luminous object detection is challenging due to the abstract semantic meanings and vague boundaries.

Other conventional techniques that use complex image processing and adopt prior knowledge of specific datasets neglect the common properties of self-luminous targets. With much noise affecting the prediction of the vague boundaries and extracting semantic information, previous techniques generate low-quality proposals.

Thus, the accuracy of bounding box positions is limited, and predicted categories that are dependent on the quality of region proposals will also be significantly influenced by confusing information. Accordingly, the conventional techniques are not optimal for autonomous driving applications.

SUMMARY

Thereby, the inventors have identified a need in the art and have discovered a novel vehicle light signal detection network with two components, including a coarse attention module and a fine attention module. These two sub-modules promote each other and can be embedded in various existing object detection networks based on neural networks. They also can train end-to-end with no additional supervision. Thus, the inventors propose a Coarse-to-Fine Attention (CFA) mechanism to combat conventional challenges to dynamically localize the informative patterns that correspond to abstract regions. Specifically, features that are responsible for bounding box localization and category classification are clustered to expert channels with the new inventive coarse-attention module, and patterns are extracted from the noisy proposal regions with the fine-attention module.

That is, the invention includes a practical application as a result of the technical improvement because the invention can systematically learn the feature of self-luminous targets (i.e., vehicle taillights) and dynamically extract informative patterns from region proposals, allowing more noise in proposal regions. Thereby, bounding boxes and predicted categories can be obtained quickly and accurately, which is mostly unavailable in conventional techniques. Moreover, the inventive coarse-to-fine attention module can be integrated into any two-stage detectors while keeping end-to-end training paradigm, thereby solving the problems of existing techniques being constrained to the particular structures or appearances of data.

In one exemplary embodiment, the present invention provides a computer-implemented vehicle light signal detection and recognition method, the method including bounding, using a coarse attention module, one or more regions of an image of an automobile including at least one of a brake light and a signal light generated by automobile signals which include illuminated sections to generate one or more bounded region, removing, using a fine attention module, noise from the one or more bounded regions to generate one or more noise-free bounded regions, and identifying the at least one of the brake light and the signal light from the one or more noise-free bounded regions.

In another exemplary embodiment, the present invention provides a computer program product, the computer program product comprising a computer-readable storage medium having program instructions embodied therewith, the program instructions executable by a computer to cause the computer to perform: bounding, using a coarse attention module, one or more regions of an image of an automobile including at least one of a brake light and a signal light generated by automobile signals which include illuminated sections to generate one or more bounded region, removing, using a fine attention module, noise from the one or more bounded regions to generate one or more noise-free bounded regions, and identifying the at least one of the brake light and the signal light from the one or more noise-free bounded regions.

In another exemplary embodiment, the present invention provides a vehicle light signal detection and recognition system, the system including a processor, and a memory, the memory storing instructions to cause the processor to perform: bounding, using a coarse attention module, one or more regions of an image of an automobile including at least one of a brake light and a signal light generated by automobile signals which include illuminated sections to generate one or more bounded region, removing, using a fine attention module, noise from the one or more bounded regions to generate one or more noise-free bounded regions, and identifying the at least one of the brake light and the signal light from the one or more noise-free bounded regions.

In one optional embodiment, the coarse attention module receives a smaller-feature-map from a region of interest (ROI) pooling module, and the fine attention module receives a bigger-feature-map from the ROI pooling module.

In another optional embodiment, the coarse attention module includes two branches for calculation including an attention score branch and an expected learning score branch, in the attention score learning branch, coarse attention module converts the smaller-feature-map to an original feature vector, and in the expected score learning branch, the coarse attention module calculates an average of all previous features of a same category as a channel expected attention score (C-E score) of each category, which is multiplied by the smaller-feature-map to obtain a refined feature map-1.

In another optional embodiment, the fine attention module uses the bigger-feature-map and the coarse attention score obtained from the coarse attention module to generate a fine attention map by calculating an average of all channels scores, and the fine attention map is multiplied by the bigger-feature-map to obtain a refined feature map-2, which is used to generate discriminative regions for prediction of bounding boxes and categories.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 8 exemplarily depicts experimental results of the CFA mechanism according to an embodiment of the present invention;

DETAILED DESCRIPTION

Figure 1:
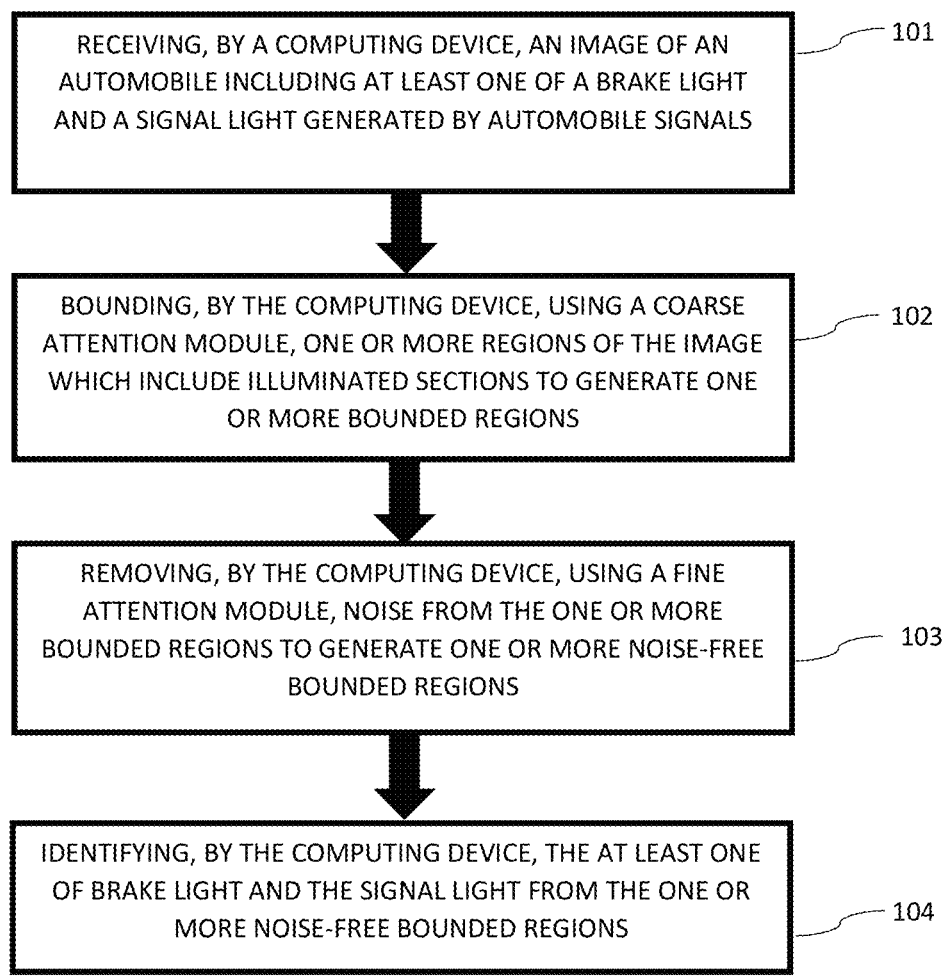
FIG. 1 exemplarily shows a high-level flow chart for a vehicle light signal detection and recognition method 100 according to an embodiment of the present invention.

The invention will now be described with reference to FIGS. 1-12, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a vehicle light signal detection and recognition method 100 according to the present invention can include various steps for using a computing device to identify brake lights and signal lights (i.e., taillights) of an automobile with a coarse attention module and a fine attention module implemented in a two-stage detector.

Figure 10:
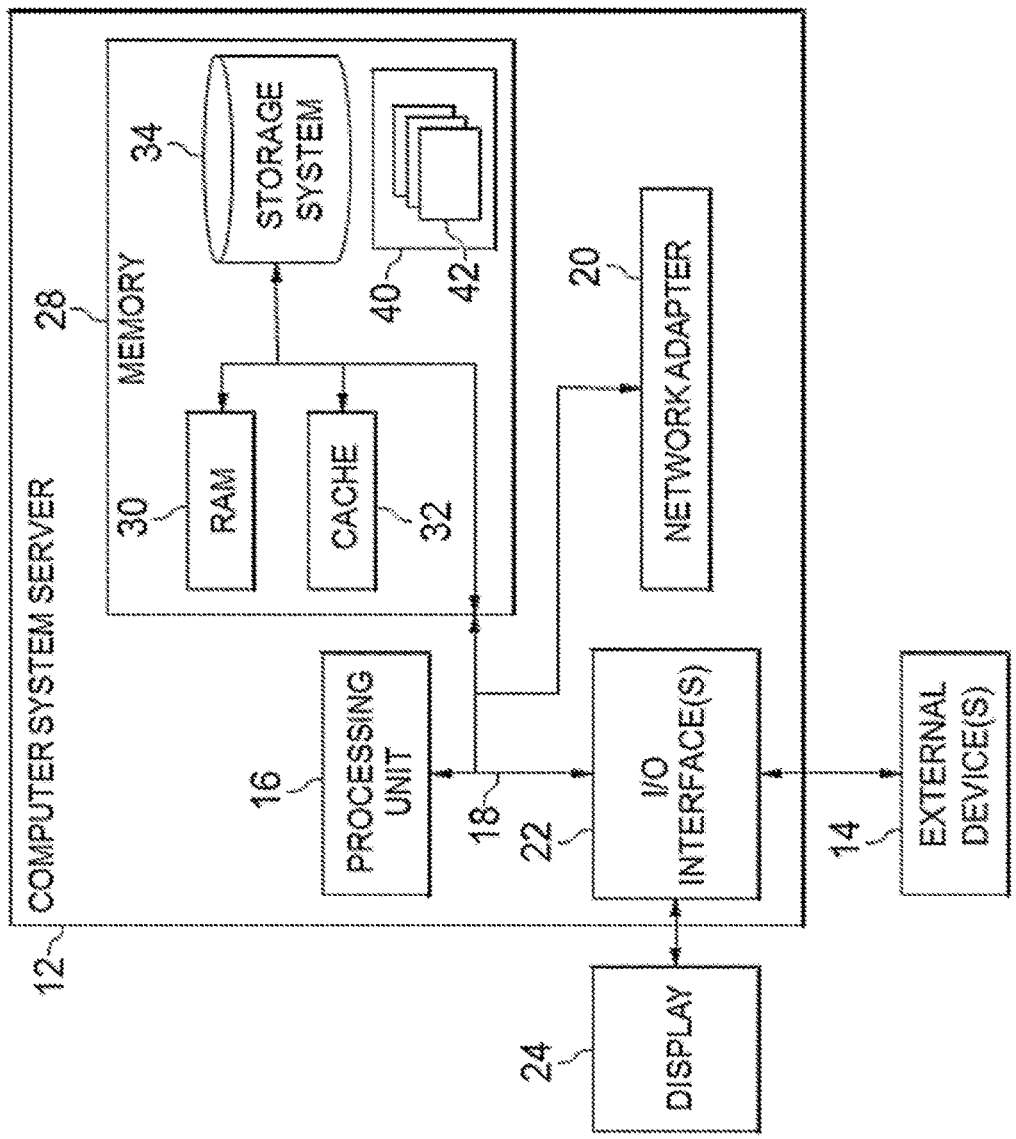
FIG. 10 depicts a cloud-computing node 10 according to an embodiment of the present invention.

By way of introduction of the example depicted in FIG. 10, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 12), it is nonetheless understood that the present invention can be implemented outside of the cloud environment.

With reference generally to FIGS. 1-9(d), detection is a fundamental task in the computer vision community and has achieved successes in many real-world scenarios, including general object detection, road object detection, and face detection. Despite the progress, self-luminous target detection remains an open research question. Conventional techniques have either used complex image processing or adopt prior knowledge of the specific datasets, ignoring the common properties of such targets. In this invention, a novel attention mechanism, called Coarse-to-Fine Attention mechanism, is described to combat the challenges lying in self-luminous target detection tasks.

Self-luminous target detection is different from general object detection for at least the following reasons. Firstly, much more noise exists in such scenarios (e.g., a bounding box regressor will be fooled to include the light noise from other cars and the surrounding road lamps which in turn causes the signal category classifier to give wrong predictions). Secondly, semantic information within the bounding boxes are important since the general contours and appearances look the same for all ground truths and the semantics are key to make correct predictions. Thirdly, a brightness and a contrast of the images have large variance, thereby causing boundaries of objects to sometimes be vague and causing separated light signals to be hard to distinguish.

Figure 9A:
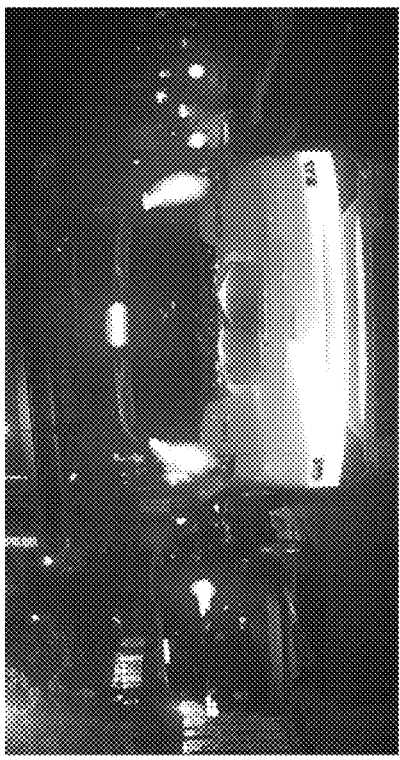
FIGS. 9(a)-9(d) exemplarily depict an illustration of a self-luminous object detection task.
Figure 9B:
Figure 9C:
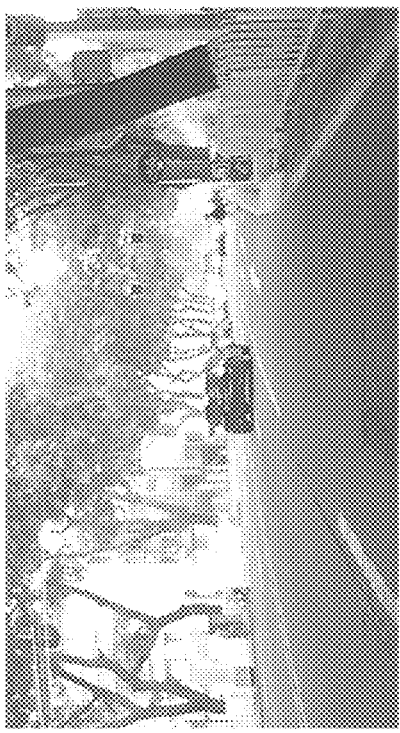
Figure 9D:
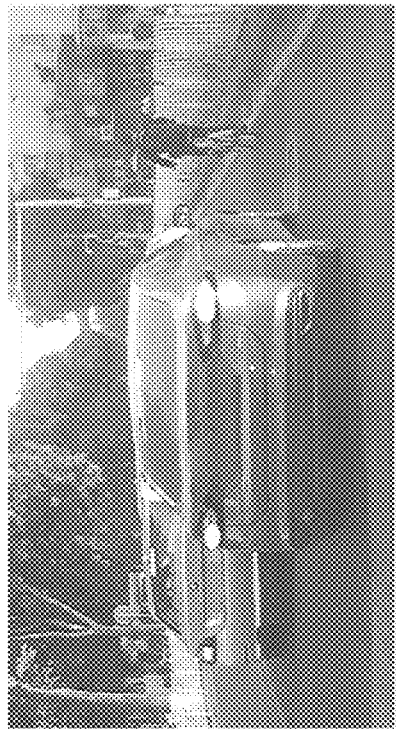

FIGS. 9(a)-9(d) exemplary depict an illustration of a self-luminous object detection task. FIG. 9(a) and FIG. 9(b) depict the contrast of light signals and how the background has large variance (i.e., it is much easier to recognize signals in 9(a) than in 9(b)). FIG. 9(c) depicts vague boundaries of bounding boxes that characterize the semantic categories and FIG. 9(d) depicts interference noise of environment light.

In two-stage general object detectors, region proposals are generated in the first stage while the accurate locations of bounding boxes and object categories are predicted in the second stage. While this pipeline is shown suitable for general object detection tasks, the pipeline leads to bad performance when it is used to detect self-luminous targets with much noise impacting the prediction of the vague boundaries and extracting semantic information. For example, boundaries of objects under low light environments are hard to decide and features of traffic light signals under different scenarios (e.g., in the rain or at night, have large variance). Thus, performance of general two-stage detectors is constrained. The region proposal generator (e.g., Region Proposal Network (RPN) in Faster R-CNN) will generate low-quality proposals due to the interference in the surroundings. Thus, an accuracy of the bounding box positions are limited and predicted categories which are highly dependent on the quality of region proposals will also be significantly influenced by confusing information.

To solve these limitations, one can either (a) learn a better region proposal network that generates both proposal locations and foreground prediction more accurately, or (b) dynamically extract informative patterns from region proposals, allowing more noise in proposal regions.

In the invention as discussed below, the method 100 and architecture follow the second efficient way to insert an attention module for noise filtering and information delivery. An exemplary motivation is to extract features from low-quality coarse region proposals by encouraging a set of expert extractors in the network, and then fine attention is followed to discover accurate regions in as spatial domain to guide detection. With this novel idea, both the above issues can be alleviated. On the one hand, accurate bounding boxes can be predicted by considering the spatial locations of certain patterns generated by the expert extractors in coarse attention, especially with structured objects where both the structures and the correlations between them needs to be considered to make accurate predictions. And, informative patterns, which are crucial for classifying such self-luminous targets (e.g., signal semantics of traffic lights), can be effectively integrated to obtain a performance boost using the inventive attention mechanism, which is named in the invention as "Coarse-to-Fine Attention mechanism" (CFA) and can be integrated with two-stage detectors for performance boosting.

With the CFA module, precise sub-parts are highly correlated to the core information and are detected so that both the bounding box locations and the category predictions will be expected to be more accurate in detection tasks handling non-rigid objects or semantic information of objects needed to be extracted from noisy proposal regions.

Specifically, coarse attention can be interpreted as an attention mechanism in a channel dimension which encourages expert channels to extract information in coarse proposals. Modal feature vectors, which are responsible for distinguishing the sub-parts without concrete appearance semantics in objects, are generated to represent certain patterns in underlying data in an unsupervised manner. Since the coarse attention builds a bridge between channel dimension and spatial dimension, expert feature extractors are expected to focus on specific informative spatial patterns. Benefited from information delivery to modal feature vectors at expert channels, fine attention is followed to predict accurate attention maps in a spatial domain. In this way, region proposal networks are implicitly optimized to contain desired information with backpropagation (i.e., the areas that characterize the semantic meanings and boundaries).

As discussed below, a Coarse-to-Fine Attention (CFA) module is detailed and can be inserted directly into Faster R-CNN or other conventional two-stage detectors for self-luminous object detection tasks. There is provided mathematical proofs and intuitive inspiration of the proposed CFA mechanism to validate its effectiveness. And, as shown in FIG. 8, experiments on a CIFAR-10 dataset is conducted for proof-of-correctness of the coarse attention module, and report the performance of the attention mechanism on a dataset, which beats the baseline by a large margin.

Figure 2:
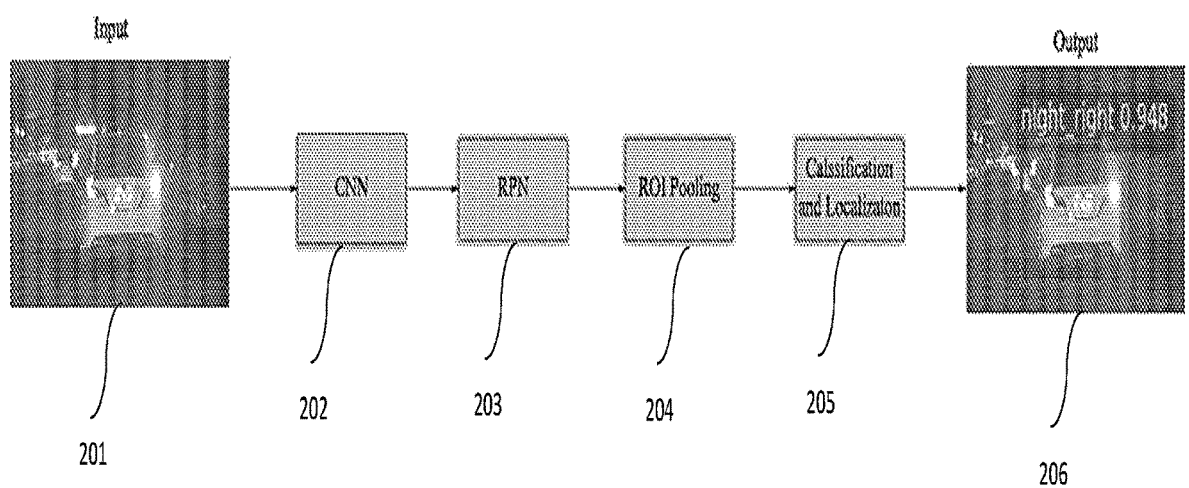
FIGS. 2-7 exemplarily depicts a system architecture of a Coarse-to-Fine Attention (CFA) mechanism that implements the method 100 according to an embodiment of the present invention.

FIG. 2 provides a backbone model for the invention. The input images 201 of vehicle taillights go through a Convolutional Neural Network (CNN) module 202 for feature extracting and a Region Proposal Network (RPN) module 203 for original region proposals.

Figure 3:
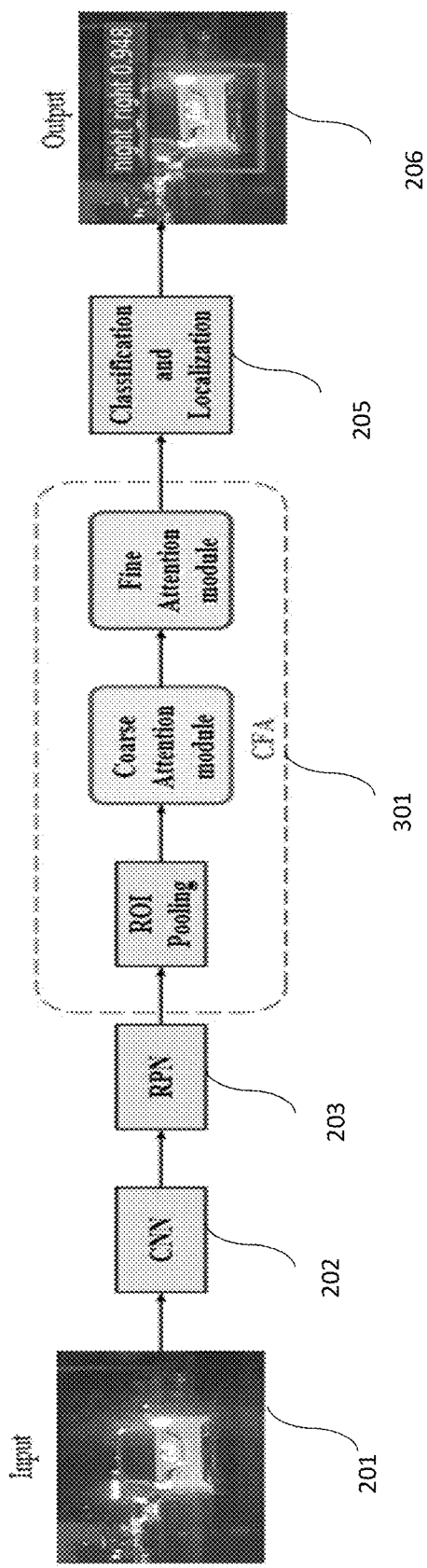

The invention CFA module 301 replaces the Region of Interest (ROI) pooling section 204 of FIG. 2 as shown in FIG. 3 which feeds into a classification and localization module 205 and provides the output 206. The CFA includes two coupled attention modules: coarse attention module 301a and fine attention 301b. The ROI pooling feeds into the coarse attention module and the fine attention module. The coarse attention module clusters informative features to expert channels as central feature vectors and assigns attention weight for each channel iteratively. The fine attention module leverages the information from the coarse attention module and extracts spatial attention regions in the rough proposals. By generating the central feature vectors from coarse attention, fine attention is followed. In the invention, central feature vectors and modal feature vectors are used interchangeably, which both refer to the feature patterns that are responsible for the bounding box localization and category classification.

Coarse attention bridges the connections between channel dimension and spatial dimension by considering informative patterns underlying the data for each channel possesses. Fine attention fuses the central feature vectors to provide a spatial attention map for bounding box regression and class prediction. CFA can be inserted in any two-stage detector and the overall network can be optimized in an end-to-end manner. One example of the CFA module integrated with Faster R-CNN is shown in FIG. 3. Since fine attention is responsible for generating a spatial attention map, larger sizes of spatial dimensions are desired. By assigning each channel, an attention weight and encourage central features to channels with high attention weight (e.g., expert channels, patterns that correspond to self-luminous objects in rough proposals are extracted from the noise).

Figure 4:
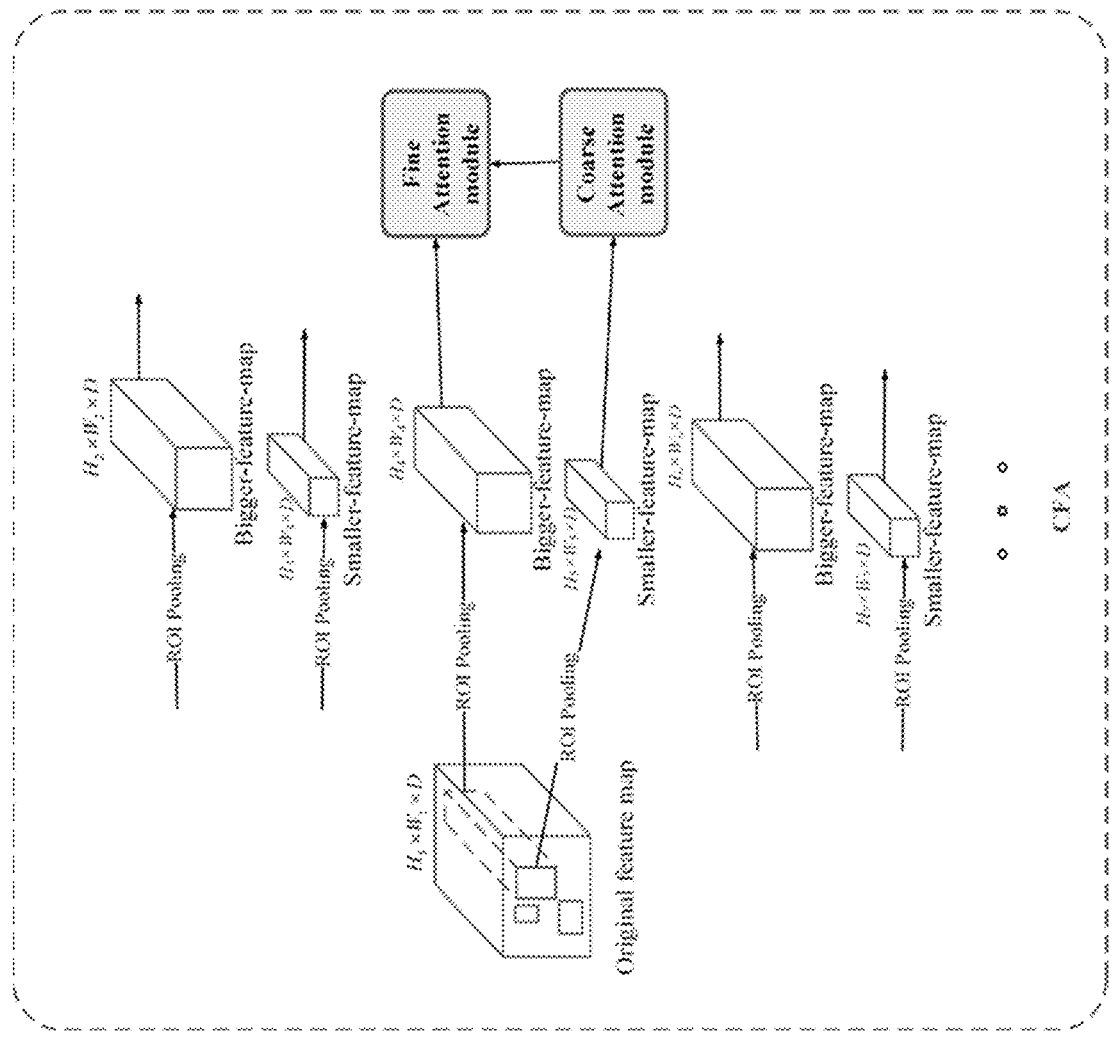

For example, FIG. 4 depicts the ROI pooling input in more detail. There is generated two different feature maps called a "bigger-feature-map" and a "smaller-feature-map" by the ROI pooling with different kernels in the original feature map from RPN. Since the fine attention module focuses on refined information extraction, the feature map used in the fine attention module is, for example, twice the size of that in the coarse attention module (e.g.: $H2=2H3$, $W2=2W3$). The invention can generate multiple CAs and FAs with different scales of feature maps of ROI. Thus, the sizes of the feature maps are not limited.

Then, as shown in FIG. 4, the CFA module extracts informative patterns from the original region proposals to predict more accurate boundaries and categories. With the help of the CFA module, the accuracy of the outputs of vehicle light signal detection will be greatly improved. As noted, the CFA module composed of the coarse attention module and the fine attention module can be embedded in any two-stage detectors for self-luminous object detection.

Figure 5:
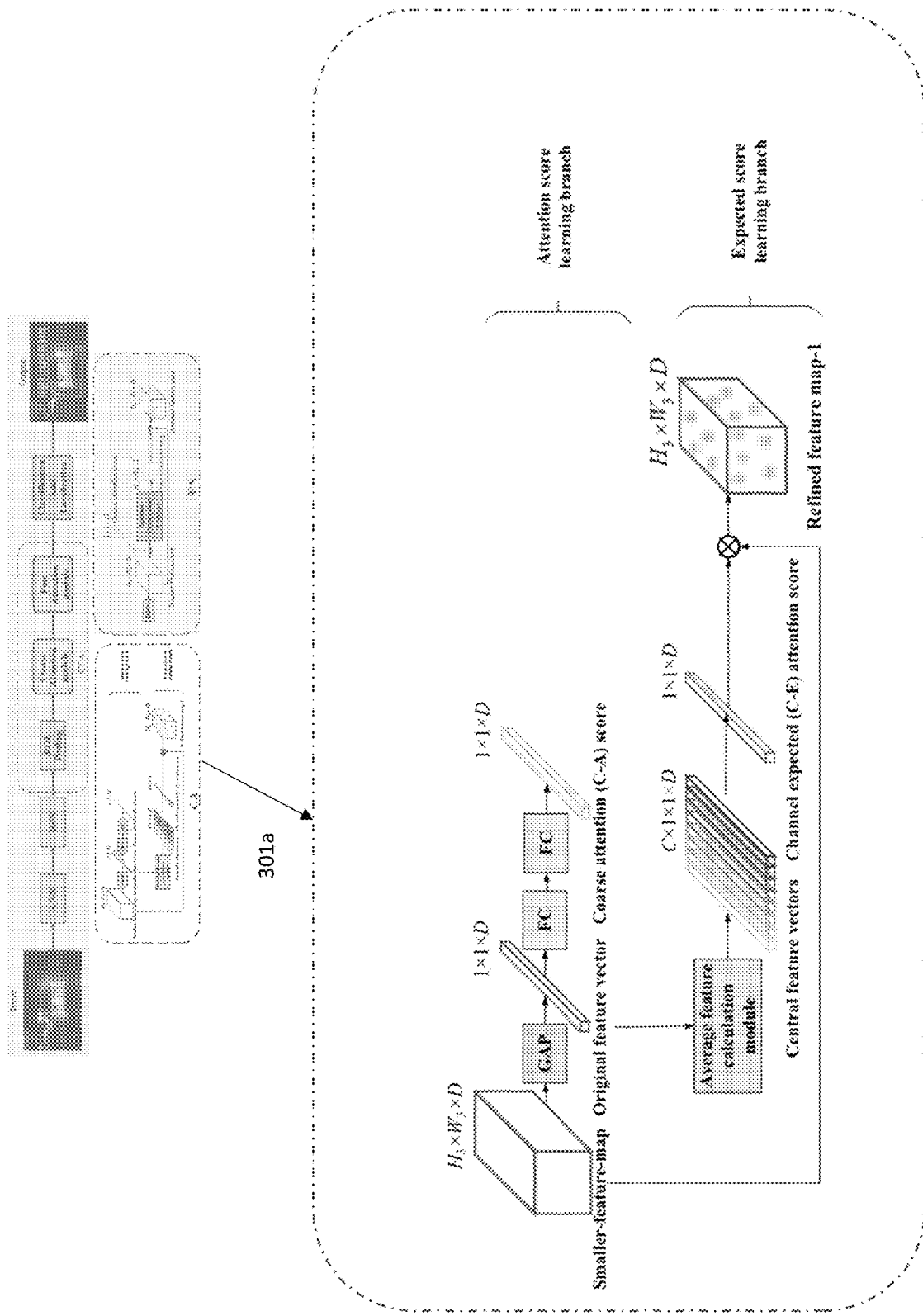

FIG. 5 depicts the Coarse Attention module (CA) which has an input of the smaller feature map from the ROI pooling. The CA module extracts expressive modal vectors that are responsible for localizing disentangled spatial patterns with a set of expert feature extractors. To filter interference noise and assign attention weights to feature learning channels, the CA module clusters informative features to expert channels as central feature vectors and assigns a weight for each channel iteratively.

Since inaccurate region proposals contain confusing information, the invention aims to train a set of feature extractors responsible for the desired information. However, direct training of high-dimensional neural networks will non-selectively consider the noisy patterns outside the informative sub-areas. With this motivation, the invention discovers the desired parts in the coarse regions by delivering important features to certain channels and learning the modal feature vectors for each part.

The expert feature extractors are encouraged to focus on specific patterns by forcing similar modal vectors to be generated with the same categories which contain similar semantic information. The spatial positions are expected to benefit bounding box localization, and symmetrically (i.e., in an iterative way). With backpropagation, correlated distinguishable features can be delivered to the clustering of specific patterns in a way similar to mixture models to update modal vectors and send useful information that are responsible for such patterns in a dynamic way. To extract informative features from coarse proposal regions, the motivation is to optimize a set of expert feature extractors by assigning channels with high attention weights and regularize informative features to cluster to the corresponding expert channels by encouraging central features of each class to be extracted by experts.

Each channel of features is position-aware and all instances of the same categories share central features with several perfect pattern extractors. The properties above do not hold for features lying in each channel, but one can encourage important information to cluster to several channels and implicitly disentangle features with sparse representation by backpropagation. That is, the CA module adds regularization to model the desired modal vectors for each class by dynamically weighting the importance of channels. Channels with a high attention score embed certain patterns while avoiding integrating noisy features.

The CA module implements the above idea of generating candidate modal features for each category at every channel by averaging previously trained samples at the particular channel. Then, an importance weight of each channel is dynamically assigned by calculating similarities with assumed modal features of the same category as well as dissimilarities with other categories to regularize discriminative features clustering to a set of experts, which shares similarity with mixture models to update modal vectors and weight assignments iteratively by Expectation-maximization (EM) algorithms. As training time increases, central features of important patterns can be obtained by channels with high attention scores optimized in an end-to-end manner.

As shown in FIG. 5, to learn expert feature extractors, central features for each class are approximated by averaging all generated features at the same channel of the same class. Scores at each channel of the current samples are needed to ensure important features extracted by channels with high scores.

By encouraging features at expert channels to share similarity with central features of the same class, while distinguishing from central features of different classes, channel scores S of sample i with category c can be calculated as:

$$S = -(A^c - F_i)^2 + \frac{1}{C-1}\sum_{c' \neq c}(A^{c'} - F_i)^2 \quad (1)$$

where $F_i$ is feature of current sample i, $A^c$ is the averaged central feature of class c calculated by averaging central feature from buffer and $F_i$, and C is the total number of classes, and 1/C−1 controls the weight of contribution for samples with different labels. The above process shares similarity with EM algorithms to first generate channel attention scores with weights before optimization as an "expectation step", followed by delivering informative features to channels with high scores and optimizing parameters of RPN as a "maximization step". A network is optimized to fit the channel attention scores so that the training process is stable, and the average feature buffer is avoided when testing.

The CA module includes two branches including an attention score branch (which is input into the FA module as discussed later) and an expected score learning branch.

In the attention score learning branch, the coarse attention module converts the smaller-feature-map to a value called an "original feature vector" through the Global Average Pooling (GAP), which will be used to calculate the coarse attention score (C-A score) of the feature map by two fully-connected layers (FC). The C-A score will be used as an input in the fine attention module.

In the expected score learning branch, with 8 categories and 512 channels, the coarse attention module calculates the average of all previous features of the same category as the channel expected attention score (C-E score) of each category, which will be multiplied by the smaller-feature-map to obtain refined feature map-1. Refined feature map-1 is output to the classification and localization module as discussed later.

The CA module is next shown how to mathematically work. Beginning with global average pooling, discriminative image regions are depicted by generating a class activation map (CAM) for classifying particular categories. More specifically, the feature of sample I with class c after GAP is:

$$F_d = \frac{1}{XY}\sum_{x=1}^{X}\sum_{y=1}^{Y} f_d(x, y) \quad (2)$$

where d denotes the index of channel dimension, and $f_d(x, y)$ represents the feature map at channel d at position (x, y). Then the FC layer is followed to compute the original classification output score $O_{org}$:

$$O_{org} = \sum_d (W_d F_d) \quad (3)$$

where $W_d$ is the weight of the FC layer of class c at channel dimension d. With the proposed coarse attention mechanism, each channel is assigned an attention weight S as in Eq. (1), and the corresponding output score is:

$$O = \sum_d (S_d W_d F_d) \quad (4)$$

By eliminating $F_d^2$ in $S_d$, output score O can be calculated as:

$$O = \sum_d \left(-(A_d^c - F_d)^2 + \frac{1}{C-1}\sum_{c' \neq c}(A_d^{c'} - F_d)^2\right) W_d F_d = \quad (5)$$
$$\sum_d \left(\left(\frac{1}{C-1}\sum_{c' \neq c} A_d^{c'2} - A_d^{c2}\right) + 2F_d\left(A_d^c - \frac{1}{C-1}\sum_{c' \neq c} A_d^{c'} - A_d^c\right)\right) W_d F_d =$$
$$\sum_d ((\alpha F_d + \beta) W_d F_d),$$

where $f_d$ is features of current sample at channel d, and $A_d^c$ is the central features at channel d of category c. In the inventive implementation, $A_d^c$ is approximated by averaging all previously trained samples of instances with category c at channel c and is saved in the buffer at each iteration. So, $$\alpha = 2\left(A_d^c - \frac{1}{C-1}\sum_{c' \neq c} A_d^{c'} - A_d^c\right) W_d F_d$$

and $$\beta = \frac{1}{C-1}\sum_{c' \neq c} A_d^{c'2} - A_d^{c2}$$

are treated as constant vectors.

The optimization can thus be viewed as two main steps. Firstly, calculate the central features and attention weights and secondly optimize parameters of the classifier. For each channel d, the invention first calculates $F_d^{avg}$ and $F_d^{avg}$ as a modal feature vector and a channel attention weight, respectively. Since weights $W_d$ are parameters corresponding to the same class c, maximizing O is desired. When an attention score is high at channel d, $W_d F_d$ is also expected to be high, and $W_d$ is optimized accordingly. Thus, in the training process, $F_d$ is encouraged to contain modal features for the same category to make the output score O large with expert channel weight $W_d$. In this way, central features as well as $W_d$ and parameters that are responsible for generating Fa are optimized iteratively in a similar manner with EM algorithms.

Figure 6:
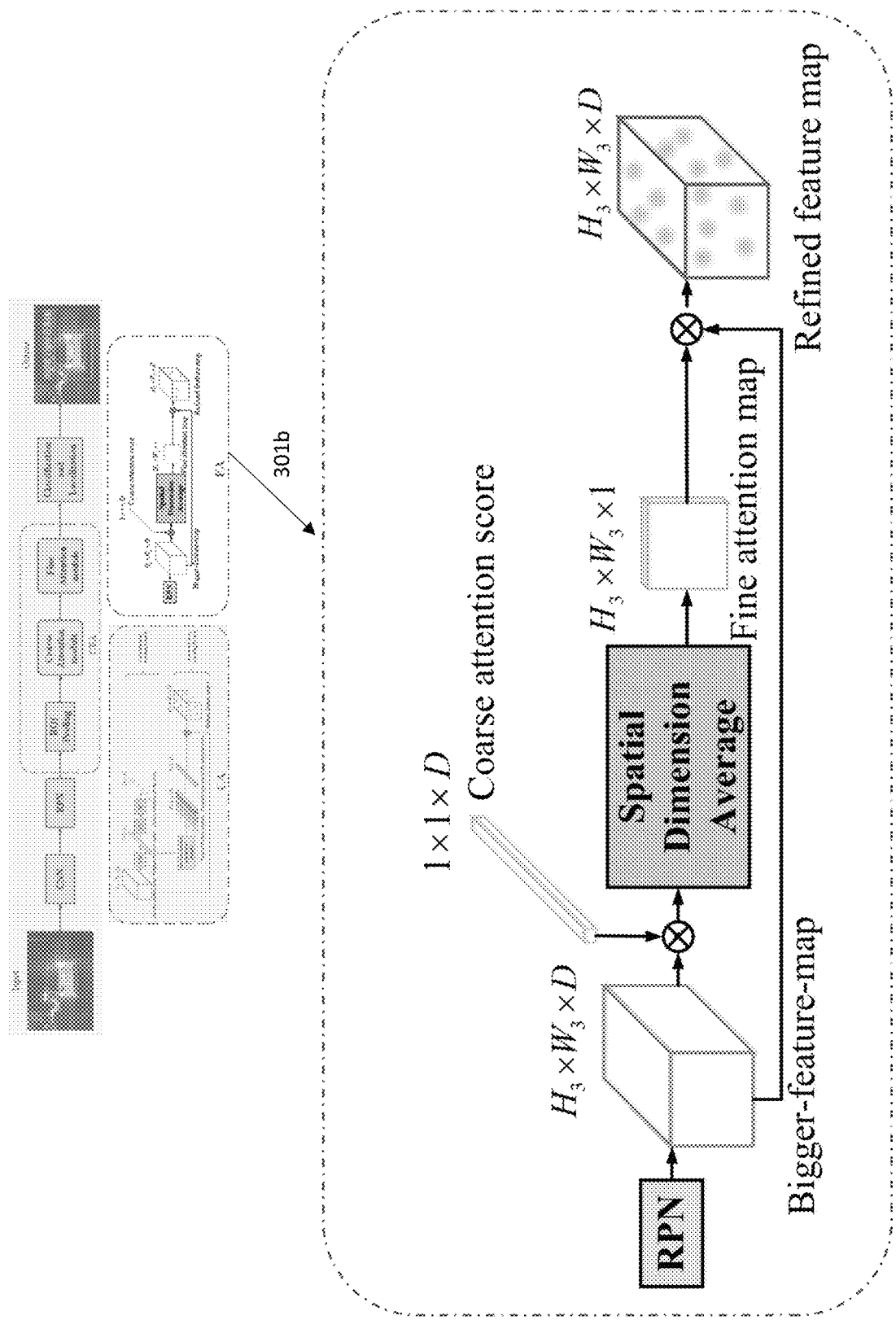

With reference to FIG. 6 and to refine localization, the fine attention (FA) module generates a refined feature map to localize the precise discriminative regions for the accurate prediction of bounding boxes and categories. The bigger-feature-map and the coarse attention score obtained from the previous CA, module are adopted to generate a fine attention map by calculating the average of all channels scores. Then, the fine attention map is multiplied by the bigger-feature-map to get refined feature map-2, which can be used to generate a discriminative regions for prediction of bounding boxes and categories. The refined feature map-2 is input into the classification and localization module as described later.

That is, the coarse attention builds the connection between the channel dimension and spatial dimension by clustering distinguishable spatial features to a set of channels. However, to get a better understanding of semantic meanings and thus predicting bounding boxes and categories more precisely, one needs a fine attention module to localize the exact spatial regions that are responsible for the semantic categories and ground truth bounding boxes. Since the invention has already obtained several experts of feature extractors which focus on specific central features of interests (i.e., via the CA module), the invention can generate a spatial attention mask by a weighted-sum of the spatial areas on which each expert focuses to give attention containing sub-areas that interpret semantic categories and bounding box locations. Indeed, the fine attention module generates a spatial attention map to locate the discriminative parts that are responsible for predicting bounding boxes and semantic categories.

As noted above, the architecture of the fine attention module is illustrated in FIG. 6. The input feature maps are generated from RPN through ROI pooling. Then, the predicted channel attention scores obtained from the previous CA module are adopted to generate the spatial attention mask, and features are refined accordingly. That is:

$$f(x, y) = \sigma\left(\sum_d (S_d \cdot f_d(x, y))\right) f(x, y), \quad (6)$$

where f(x, y) is input features, d is channel index, $S_d$ is channel attention score at channel d generated by coarse attention module, and σ is sigmoid activation function.

Figure 7:
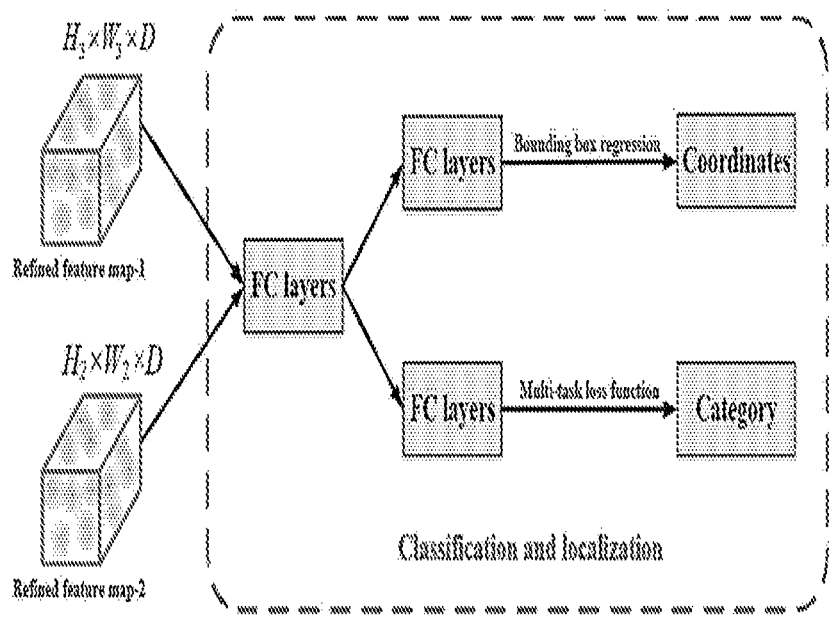

As shown in FIG. 7, in the classification and localization module 205, the two refined feature maps from the coarse attention module and the fine attention module are converted to a value by the fully-connected layers, which can be used to calculate the coordinates of bounding boxes and the categories of the objects in the bounding boxes.

The total loss of the self-luminous object detection task is the weighted sum of the classification loss and the regression loss. For the classification loss, a multi-task loss function and a non-maximum suppression method (NMS) is utilized to calculate the classification loss. For the regression loss, a residual fitting method to calculate the regression loss is utilized. Specifically, the deviation between the actual value of the bounding box (actual value) and the ground truth value (ground truth) of the bounding box is calculated by regression learning.

Turning to FIG. 1, FIG. 1 exemplarily depicts a method flow of the inventive coarse-to-fine attention mechanism for self-luminous object detection tasks. The CFA is designed to deal with the challenges of what characterize the objects, including the bounding boxes and semantic meanings, alleviating the problems caused by noise in coarse proposal regions (e.g., surrounding road lights will cause confusion if they are also included in proposal regions).

In step 101, the invention includes receiving, by a computing device, an image of an automobile including a brake light and or a signal light (i.e., taillights comprise brake lights and signal lights) generated by automobile signals.

In step 102, the invention includes bounding, by the computing device, using a coarse attention module, one or more regions of the image which include illuminated sections to generate one or more bounded regions.

In step 103, the invention includes removing, by the computing device, using a fine attention module, noise from the one or more bounded regions to generate one or more noise-free bounded regions. An output from the coarse attention module is utilized in the fine attention module.

In step 104, the invention includes identifying, by the computing device, the brake light and/or the signal light from the one or more noise-free bounded regions, Thereby, the invention includes a coarse attention module to filter interference noise in the environment and assign an attention weight to every feature learning channel, which benefits the following prediction of bounding boxes and categories, a fine attention module to localize the precise discriminative regions for the accurate prediction of bounding boxes and categories, and an end-to-end learning network by combining a classical object detection network(s) with novel coarse and fine attention modules for self-luminous object detection.

Indeed, as shown in FIG. 8, the inventors have adopted a Vehicle Light Signal (VLS) dataset for results analysis due to the challenges of localizing light signals and extracting the semantic information. VLS dataset contains four common behaviours of vehicles: driving forward, braking, turning left, and turning right. Each behaviour signal is classified at two scenarios: day and night, since the lighting signals are not the same when during the day and night. The data is collected from the driving recorder by uniform sampling 15 frames from one video which is 15 minutes. The VLS dataset includes 7720 images, 8 categories, and 10571 instances totally. The bounding boxes are classified by driving forward, braking, turning left and turning right, in daytime and night respectively. 60% of samples are randomly chosen as training data, 20% as validation and 20% as testing in experiments, and this ratio can be fixed for different models in other experiments.

The models are implemented, for example, using the deep learning framework Caffe. The models are trained on one NVIDIA GTX 1080Ti. For all the models, the initial learning rate is set to $10^{-3}$, the momentum is set to 0.9 and the weight decay is $5\times10^{-4}$. In the task, the input of the system is original image, and the output contains the position of vehicle and the classification result of vehicle light signal in this image. Thus, the average precision (AP) of each category is used and the mean average precision (MAP) in object detection as the performance evaluation criteria.

A large part of state-of-the-art methods which are used in light signal detection tasks adopt general object detectors. Previous works are used to first evaluate the performance of the popular two-stage general object detector Faster R-CNN with different backbones, and evaluate the performance when integrating the inventive Coarse-to-Fine Attention mechanisms. Results are shown at FIG. 8. One can see that with the same backbone network, when trained with CFA, the detector outperforms the original models, especially when the backbone network performs poorly. That is, the inventive CFA module described herein has the ability to extract informative features from low-quality proposals with more noise or interference.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 10, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
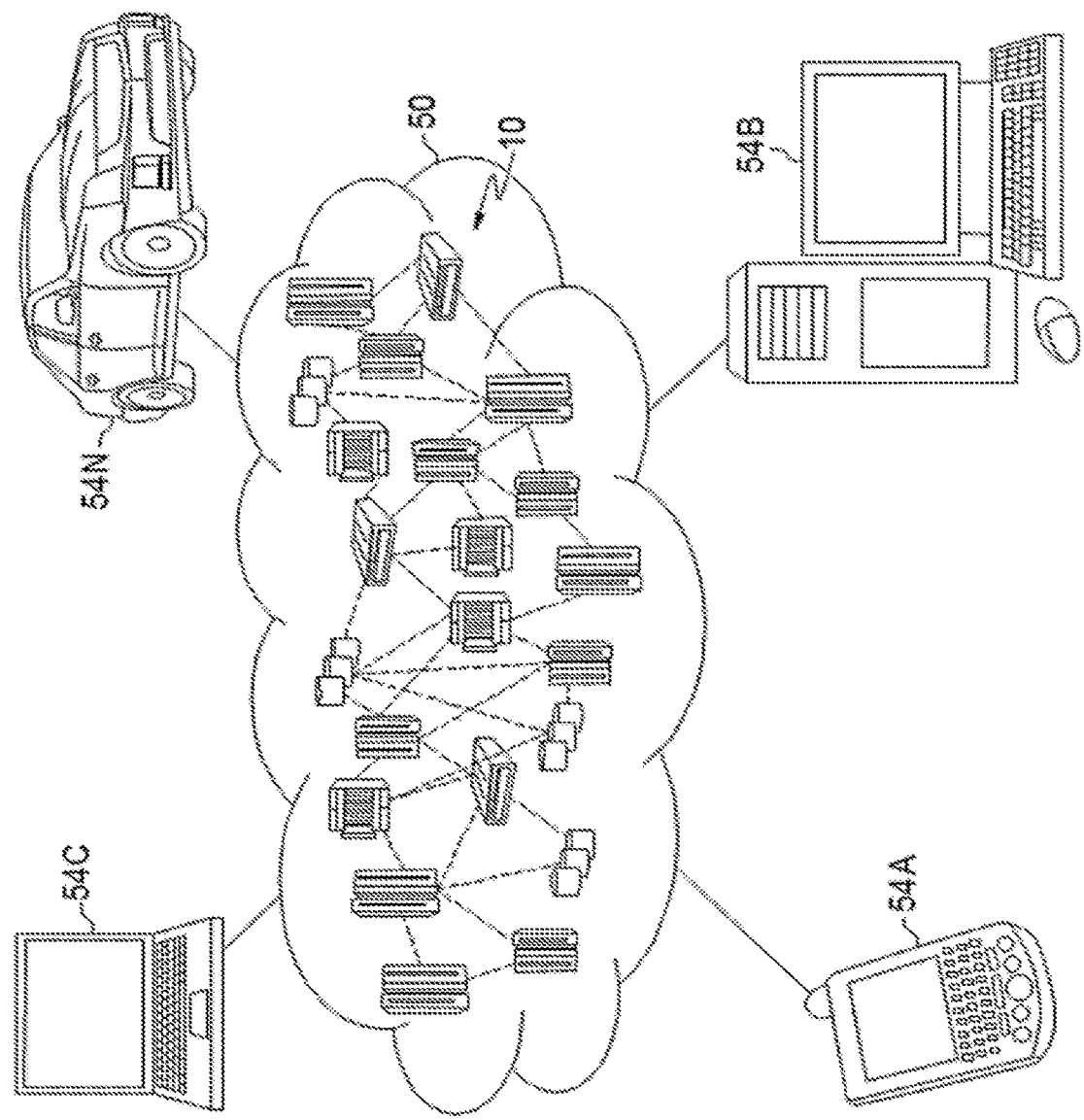
FIG. 11 depicts a cloud-computing environment 50 according to an embodiment of the present invention.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Figure 12:
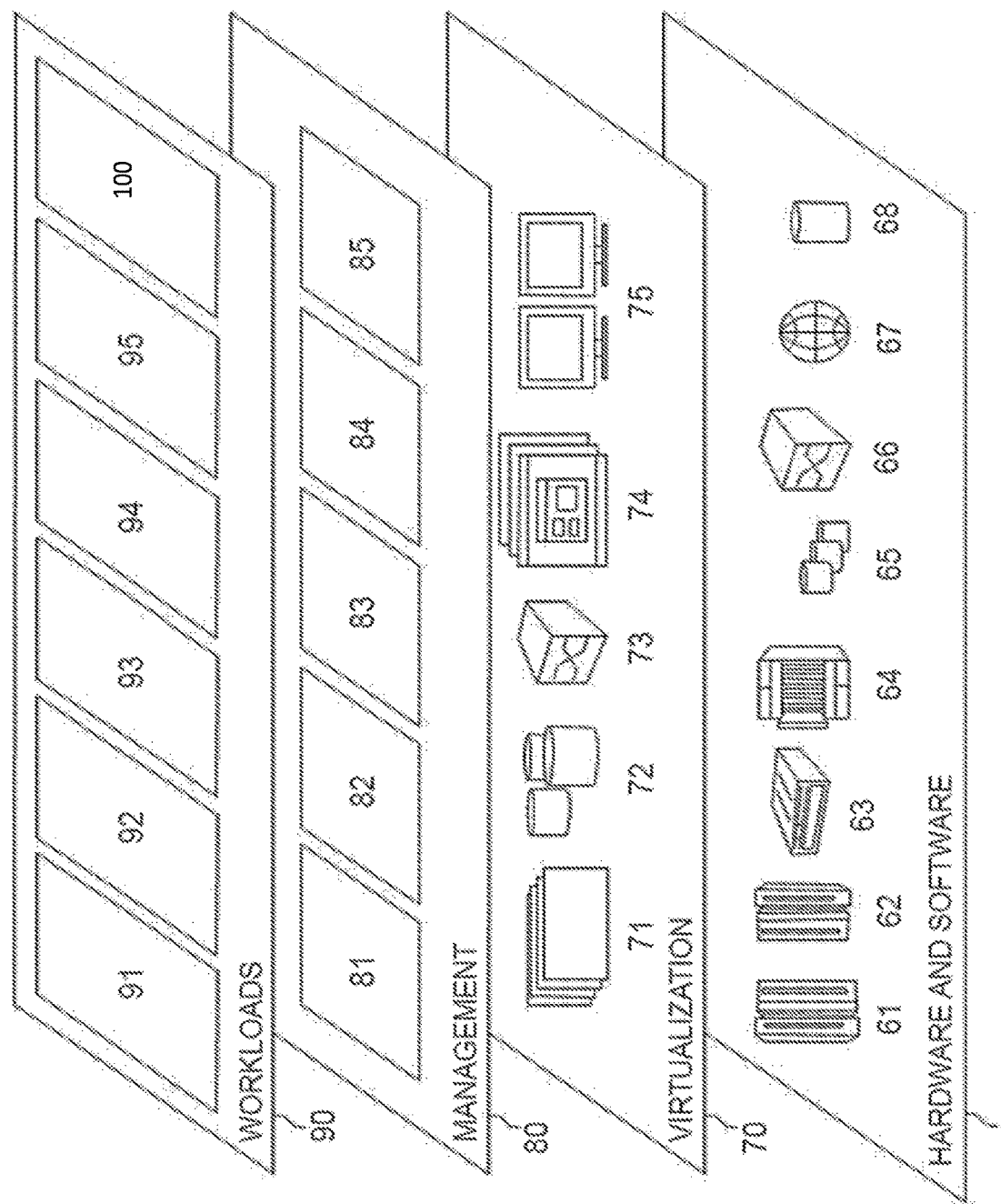
FIG. 12 depicts abstraction model layers according to an embodiment of the present invention.

Referring now to FIG. 12, an exemplary set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle light signal detection and recognition method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented vehicle light signal detection and recognition method, the method comprising:
    bounding, using a coarse attention module, self-luminous objects in one or more regions of an image of an automobile including at least one of a brake light and a signal light generated by automobile signals which include illuminated sections to generate one or more bounded region; and
    removing, using a fine attention module that generates a fine attention map, noise from the one or more bounded regions to generate one or more noise-free bounded regions,
    wherein the fine attention module receives a bigger-feature-map from a region of interest (ROI) pooling module, and
    wherein the bigger-feature-map is multiplied by the fine attention map to obtain a refined feature map,
    the method further comprising identifying the at least one of the brake light and the signal light from the one or more noise-free bounded regions based on the refined feature map.

2. The method of claim 1, wherein the coarse attention module and the fine attention module use neural networks.

3. The method of claim 1, wherein the coarse attention module extracts features from low-quality coarse region proposals by encouraging a set of expert extractors in a network, and then fine attention is followed by the fine attention module to discover accurate regions in a spatial domain to guide detection.

4. The method of claim 3, wherein bounding boxes are predicted based on spatial locations of certain patterns generated by the expert extractors by the coarse attention model.

5. The method of claim 1, wherein the coarse attention module executes coarse attention in a channel dimension which encourages expert channels to extract information in coarse proposals, which are responsible for distinguishing the sub-parts without concrete appearance semantics in objects,
    wherein modal feature vectors are generated by the coarse attention module, to represent certain patterns in underlying data in an unsupervised manner.

6. The method of claim 1, wherein a Coarse-to-Fine Attention (CFA) module comprises the coarse attention module and the fine attention module.

7. The method of claim 1, wherein the coarse attention module clusters informative features to expert channels as central feature vectors and assigns attention weight for each channel iteratively, and
    wherein the fine attention module leverages the information from the coarse attention module and extracts spatial attention regions in the rough proposals to create the spatial attention map.

8. The method of claim 1, wherein the course attention module includes an input of a smaller-feature-map from the ROI pooling module,
    wherein the coarse attention module extracts expressive modal vectors that are responsible for localizing disentangled spatial patterns with a set of expert feature extractors from the smaller-feature-map, and
    wherein the coarse attention module filters interference noise and assigns attention weights to feature learning channels by clustering informative features to expert channels as central feature vectors and assign a weight for each channel, iteratively.

9. The method of claim 1, wherein the course attention module includes an input of a smaller-feature-map from the ROI pooling module,
    wherein the coarse attention module includes two branches for calculation including an attention score learning branch and an expected score learning branch,
    wherein, in the attention score learning branch, coarse attention module converts the smaller-feature-map to an original feature vector, and
    wherein, in the expected score learning branch, the coarse attention module calculates an average of all previous features of a same category as a channel expected attention score (C-E score) of each category, which is multiplied by the smaller-feature-map to obtain a refined feature map-1.

10. The method of claim 9, wherein the fine attention module uses the bigger-feature-map and the coarse attention score obtained from the coarse attention module to generate the fine attention map by calculating an average of all channels scores, and
    wherein the refined feature map is used to generate discriminative regions for prediction of bounding boxes and categories.

11. The method of claim 1, further comprising a classification and localization module which converts the refined feature map to a value by fully-connected layers, which is used to calculate coordinates of the bounding boxes and the semantic categories of the objects in the bounding boxes, wherein a total loss of the self-luminous objects is a weighted sum of a classification loss and a regression loss computed by the classification and localization module, wherein, for the classification loss, a multi-task loss function and a non-maximum suppression method (NMS) is utilized to calculate the classification loss, and for the regression loss, a residual fitting method to calculate the regression loss is utilized that uses a deviation between an actual value of the bounding box and a ground truth value of the bounding box is calculated by regression learning.

12. The method of claim 1, embodied in a cloud-computing environment.

13. A computer program product, the computer program product comprising a computer-readable storage medium having program instructions embodied therewith, the program instructions executable by a computer to cause the computer to perform:

bounding, using a coarse attention module, self-luminous objects in one or more regions of an image of an automobile including at least one of a brake light and a signal light generated by automobile signals which include illuminated sections to generate one or more bounded region; and removing, using a fine attention module that generates a fine attention map, noise from the one or more bounded regions to generate one or more noise-free bounded regions, wherein the fine attention module receives a bigger-feature-map from a region of interest (ROI) pooling module, and wherein the bigger-feature-map is multiplied by the fine attention map to obtain a refined feature map, further comprising identifying the at least one of the brake light and the signal light from the one or more noise-free bounded regions based on the refined feature map.

14. A vehicle light signal detection and recognition system, the system comprising:

a processor; and a memory, the memory storing instructions to cause the processor to perform:

bounding, using a coarse attention module, self-luminous objects in one or more regions of an image of an automobile including at least one of a brake light and a signal light generated by automobile signals which include illuminated sections to generate one or more bounded region; and removing, using a fine attention module that generates a fine attention map, noise from the one or more bounded regions to generate one or more noise-free bounded regions, wherein the fine attention module receives a bigger-feature-map from a region of interest (ROI) pooling module, and wherein the bigger-feature-map is multiplied by the fine attention map to obtain a refined feature map, the memory further storing instructions to cause the processor to perform identifying the at least one of the brake light and the signal light from the one or more noise-free bounded regions based on the refined feature map.

\* \* \* \* \*